United States Patent
Crawford (10) Patent No.: US 11,320,031 B2
(45) Date of Patent: May 3, 2022

(54) LINEAR DIFFERENTIAL

(71) Applicant: Battelle Energy Alliance, LLC, Idaho Falls, ID (US)

(72) Inventor: Anthony Crawford, Rigby, ID (US)

(73) Assignee: BATTELLE ENERGY ALLIANCE, LLC, Idaho Falls, ID (US)

( * ) Notice: Subject to any disclaimer, the term of this patent is extended or adjusted under 35 U.S.C. 154(b) by 156 days.

(21) Appl. No.: 16/892,081

(22) Filed: Jun. 3, 2020

(65) Prior Publication Data
US 2021/0381585 A1 Dec. 9, 2021

(51) Int. Cl.
*F16H 37/16* (2006.01)
*B23B 39/00* (2006.01)
*F16H 25/20* (2006.01)

(52) U.S. Cl.
CPC ............. *F16H 37/16* (2013.01); *B23B 39/00* (2013.01); *F16H 25/2025* (2013.01); *F16H 2025/2053* (2013.01)

(58) Field of Classification Search
CPC ................ F16H 37/16; F16H 25/2025; F16H 2025/2053; B23B 39/00
See application file for complete search history.

(56) References Cited

U.S. PATENT DOCUMENTS

| | | | | |
|---|---|---|---|---|
| 3,159,046 A * | 12/1964 | Harned | ............... | F16H 25/2204 74/89.29 |
| 4,489,248 A * | 12/1984 | Petersen | .................. | F16H 25/20 310/76 |
| 8,322,242 B2 * | 12/2012 | Gronli | ..................... | F16H 25/20 74/89.27 |
| 2008/0015084 A1 * | 1/2008 | Mayumi | ................. | F16H 25/20 476/67 |
| 2009/0308188 A1 * | 12/2009 | Yang | ....................... | B25J 9/104 74/89.27 |
| 2011/0041632 A1 * | 2/2011 | Baker | .................. | B64C 13/341 74/89.23 |

* cited by examiner

*Primary Examiner* — Terence Boes (57) ABSTRACT

Apparatuses and methods of operating a linear differential (100, 600) are described herein. The linear differential (100, 600) contains a slide portion (102) with parallel right-hand and left-hand threaded rods (112, 114). Threaded onto the right-hand and left-hand threaded rods (112, 114) and attached to the slide portion (102) are right-hand and left-hand gears (116, 118). Meshed between the right-hand and left-hand gears (116, 118) and also attached to the slide portion (102) is a driven gear (200). An end effector (104) is attached to the driven gear (200) and is configured to translate along a translation axis (110) and rotate around a rotation axis (120).

20 Claims, 7 Drawing Sheets

702 ─ Translate an end effector along a translation axis by rotating right-hand and left-hand threaded rods around their respective axes at a same speed in different directions 704 ─ Rotate the end effector around a rotation axis by rotating the right-hand and left-hand threaded rods around their respective axes at a same speed in a same direction 706 ─ Translate the end effector along the translation axis and rotate the end effector around the rotation axis by rotating the right-hand and left-hand threaded rods at different speeds

Fig. 7

LINEAR DIFFERENTIAL

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

BACKGROUND

Multi-axis or multi-degree-of-freedom motion platforms are implemented in a variety of machines for a variety of applications. Motion platforms generally have serial configurations where one or more axes carry a load of one or more other axes or parallel configurations where the loads of the axes are generally independent of each other. One common type of multi-axis motion platform has translation and rotation axes, e.g., a translating drill. When this type of motion platform has a serial configuration, a drive for the translation axis needs to carry a payload of a drive for the rotation axis. This requires the translation drive to be large. Furthermore, the rotation drive may consume space on the translation axis that could otherwise be utilized for translation. Although parallel translation/rotation motion platforms have been developed to mitigate some of the issues with serial configurations, these motion platforms either use complicated linkages or expensive and hard to get parts, e.g. ball screw splines.

SUMMARY

In some aspects, a linear differential apparatus is described that provides a translation and rotation of an end effector. The linear differential apparatus contains a slide portion that is attached to the end effector and translates along a translation axis. Right-hand and left-hand threaded rods are disposed through the slide portion and parallel to the translation axis. A gear with internal right-hand threads (henceforth referred to as a right-hand gear) is mated to the right-hand threaded rod, and a gear with internal left-hand threads (henceforth referred to as a left-hand gear) is mated to the left-hand threaded rod. The right-hand and left-hand gears are rotatably affixed to the slide portion such that they can rotate on their respective axes but not translate along the translation axis relative to the slide portion. Meshed between the right-hand and left-hand gears is a driven gear that is attached to the end effector and configured to provide the rotation to the end effector. The driven gear is also rotatably affixed to the slide portion such that the driven gear can rotate around a driven gear axis but not translate along the translation axis relative to the slide portion. The linear differential further contains right-hand and left-hand drive portions configured to rotate the right-hand and left-hand threaded rods around their respective axes.

In other aspects, a method is described that operates a linear differential apparatus. The method comprises translating an end effector along a translation axis by rotating right-hand and left-hand threaded rods around their respective axes in different directions. The right-hand and left-hand threaded rods are disposed through a slide portion that is attached to the end effector, disposed parallel to the translation axis, and mated to internal threads of right-hand and left-hand gears, respectively. The right-hand and left-hand gears are connected via a driven gear that is connected to the end effector, and the three gears are rotatably affixed to the slide portion such that the gears can rotate around their respective axes but not translate along the translation axis relative to the slide portion. The method further comprises rotating the end effector around a rotation axis by rotating the right-hand and left-hand threaded rods around their respective axes in a same direction.

This summary is provided to introduce simplified concepts of a linear differential, which is further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

A linear differential apparatus and a method of operating the linear differential apparatus are described with reference to the following drawings. The same numbers are used throughout the drawings to reference like features and components.

DETAILED DESCRIPTION

Overview

Translation and rotation motion platforms are often implemented as serial or parallel configurations. Serial configurations require that a translation drive carry a rotation drive, which leads to an oversized translation drive and inefficient space utilization. Although parallel configurations solve some of the issues associated with serial configurations, complex linkages or specialty parts are often required. To overcome these problems, a linear differential is described herein. The linear differential is configured to facilitate rotation and translation in a parallel configuration without relying on linkages or expensive or hard-to-obtain parts.

Linear Differential Apparatus

Figure 1:
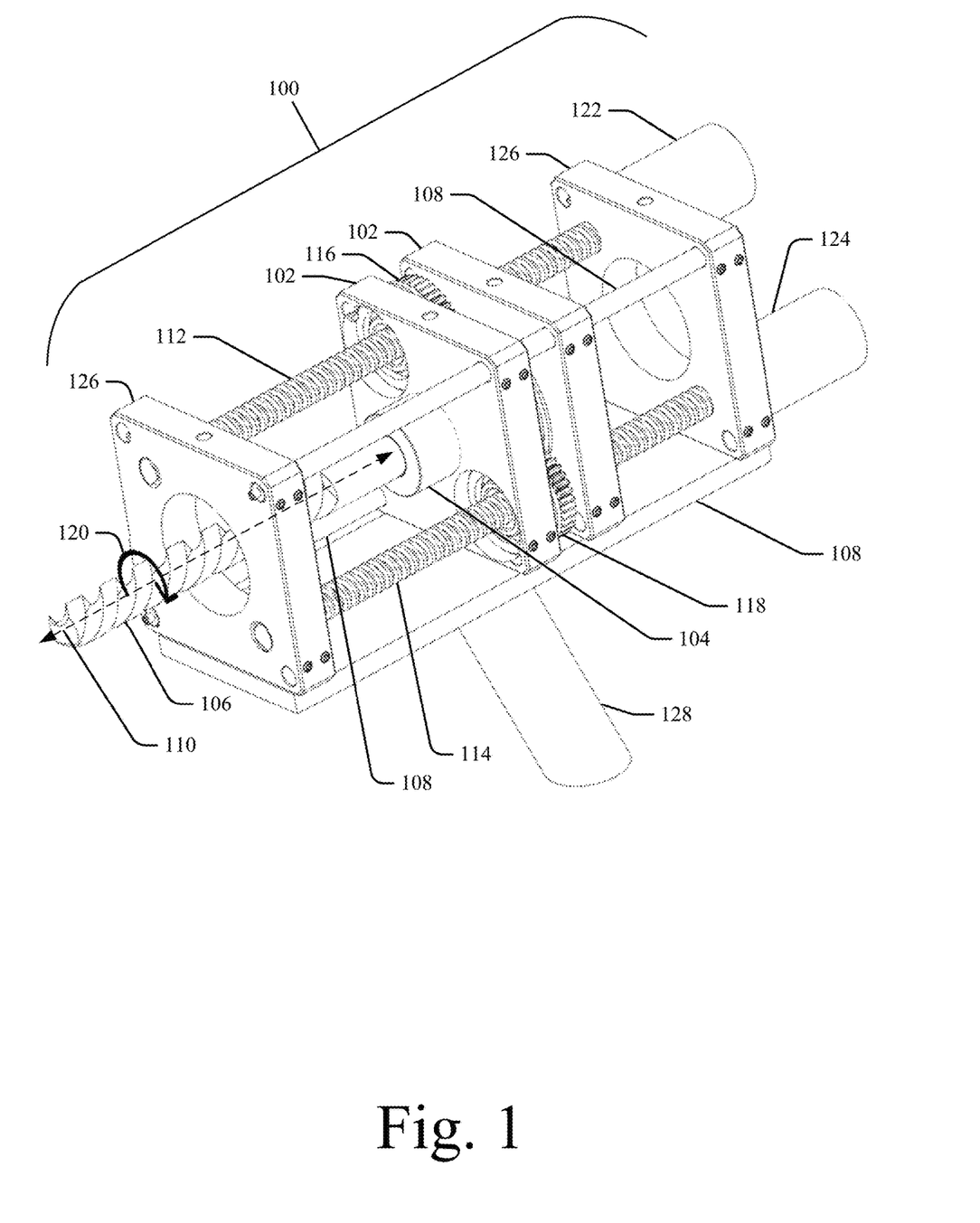
FIG. 1 illustrates an example linear differential apparatus.

FIG. 1 illustrates an example apparatus 100 of a linear differential. The apparatus 100 contains a slide portion 102 that is attached to an end effector 104. The end effector 104 can rotate but not translate relative to the slide portion 102. Although shown as a collar to accept a drill bit 106, the end effector 104 may be any mechanical holding device, e.g., a chuck, collet, taper, fixture, jig, arm, jaws, hook, vacuum nozzle, or the like. Depending on specific implementation and environment, the parts of apparatus 100 may individually be made of metal (e.g., steel, aluminum, brass, stainless steel, bronze, titanium, or nickel), fiberglass, wood, plastic (e.g., nylon, acetal, pvc, or ptfe), or other suitable material.

The apparatus 100 also contains a slide alignment portion 108 configured to allow the slide portion 102, and thus, the end effector 104, to translate along a translation axis 110. In some aspects, the end effector 104 can be further configured to restrict movement in other axes/degrees-of-freedom. In the illustrated example, the slide alignment portion 108 comprises two round rails and a flat plate. A threaded rod alignment portion 126 (discussed below) connects and aligns the two round rails and the flat plate. The slide portion 102 slides along the rails and the flat plate of the slide alignment portion 108 which facilitates the translation along the translation axis 110 while restricting movement in other degrees-of-freedom. Another example of a slide alignment portion 108 will be described in relation to FIG. 6.

Disposed through the slide portion 102 is a right-hand threaded rod 112 and a left-hand threaded rod 114. The right-hand and left-hand threaded rods 112, 114 are parallel to each other and to the translation axis 110. Right-hand and left-hand threaded rods 112, 114 may be configured as threaded rods (all-thread, UNC, UNF, BSW, BSF, metric, BA, ACME, Whitworth, square thread, etc.), ball screws, or the like. Furthermore, positions of right-hand and left-hand threaded rods 112, 114 may be switched without departing from the scope of the disclosure and thread pitches of the right-hand and left-hand threaded rods 112, 114 may be changed based on specific implementations. For example, using a fine thread will cause the apparatus 100 to be more translation dominant, and using a coarser thread will cause the apparatus 100 to be more rotation dominant.

Figure 6:
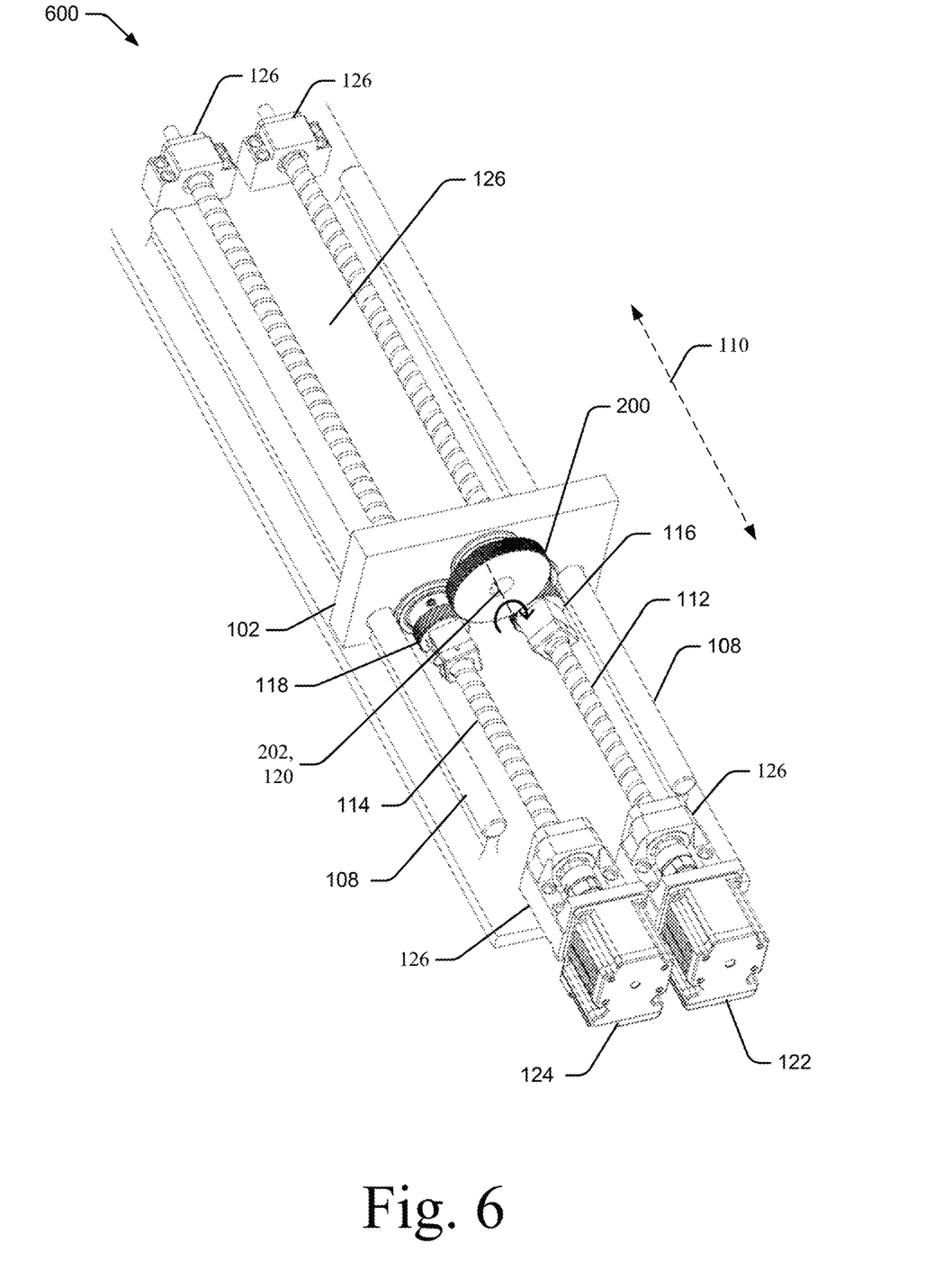
FIG. 6 illustrates another example linear differential apparatus.

A right-hand gear 116 having internal right-hand threads may be attached to the right-hand threaded rod 112. The right-hand gear 116 may be rotatably affixed to the slide portion 102 such that the right-hand gear 116 can rotate around a right-hand gear axis (shown in FIG. 2) that is coincident with a right-hand threaded rod axis 204 but not translate along the translation axis 110 relative to the slide portion 102. A left-hand gear 118 having internal left-hand threads may be attached to the left-hand threaded rod 114. The left-hand gear 118 may be rotatably affixed to the slide portion 102 such that the left-hand gear 118 can rotate around a left-hand gear axis (shown in FIG. 2) that is coincident with a left-hand threaded rod axis 206 but not translate along the translation axis 110 relative to the slide portion 102. In some aspects, the right-hand gear 116 and the left-hand gear 118 are threaded onto the right-hand threaded rod 112 and left-hand threaded rod 114, respectively. The right-hand and left-hand gears 116, 118 may be configured as straight cut gears or helical gears and may be threaded themselves or contain separate nuts with internal threads (e.g., as shown in example apparatus 600).

A driven gear 200 (shown in FIG. 2) is attached to the end effector 104 and provides the rotation to the end effector 104 around a rotation axis 120. The driven gear 200 (hidden from view behind the slide portion 102) is meshed between the right-hand gear 116 and the left-hand gear 118. The driven gear 200 can be rotatably affixed to the slide portion 102 such that the driven gear 200 can rotate around a driven gear axis 202 that is coincident with the translation axis 110. Gear ratios between the right-hand and left-hand gears 116, 118 and the driven gear may change without departing from the scope of the disclosure. Gear ratios may be selected for different applications and/or uses of the linear differential based on, inter alia, testing and experience.

In some aspects, the right-hand threaded rod 112 is attached to a right-hand drive portion 122 and the left-hand threaded rod 114 is attached to a left-hand drive portion 124. The right-hand drive portion 122 may be configured to selectively rotate the right-hand threaded rod 112 and the left-hand drive portion 124 may be configured to selectively rotate the left-hand threaded rod 114. Right-hand and left-hand drive portions 122, 124 may include and/or be implemented as motors, cranks, knobs, engines, or any other rotary drive device, and may be human driven or power driven.

When implemented as motors, information about the right-hand and left-hand drive portions 122, 124 (position, speed, torque, power input/consumption, temperature, etc.) may be used to monitor a translation force/load and/or a rotation moment/torque of the end effector 104 as well as translation and/or rotation speed. For example, loads on the drive portions 122, 124 in a translation scenario (FIG. 3) are proportional to a translation force of the end effector 104. Similarly, loads on the drive portions 122, 124 in a rotation scenario (FIG. 4) are proportional to a rotation torque of the end effector 104. In a mixed translation/rotation scenario (FIG. 5), loads on the right-hand and left-hand drive portions 122, 124 are proportional to the proportion of input going toward translation versus proportion of input going toward rotation of the end effector 104.

Apparatus 100 further includes the threaded rod alignment portion 126 that, along with aligning the slide alignment portion 108, aligns the right-hand and left-hand threaded rods 112, 114. The right-hand and left-hand drive portions 122, 124 may be attached to the threaded rod alignment portion 126. Furthermore, in the illustrated example, the threaded rod alignment portion 126 is attached to the slide alignment portion 108, and a handle 128 is attached to the plate portion of the slide alignment portion 108. The handle 128 can be configured to facilitate use of the apparatus 100 as a handheld device. Other implementations may include other mounting provisions to attach to robotics, actuators, fixtures, frames, etc.

In the illustrated example, the right-hand gear 116, the left-hand gear 118, and the driven gear 200 are sandwiched between two portions of the slide portion 102. For these presented component geometries, this enables the three gears to rotate on their respective axes while not translating relative to the slide portion 102. The same device operations may be achieved via the use of other component configurations (e.g., apparatus 600). For the sake of brevity, components such as bearings, hardware, standoffs, wiring, and holes are not described herein, as such components would be readily known/implemented by one of ordinary skill.

Figure 2:
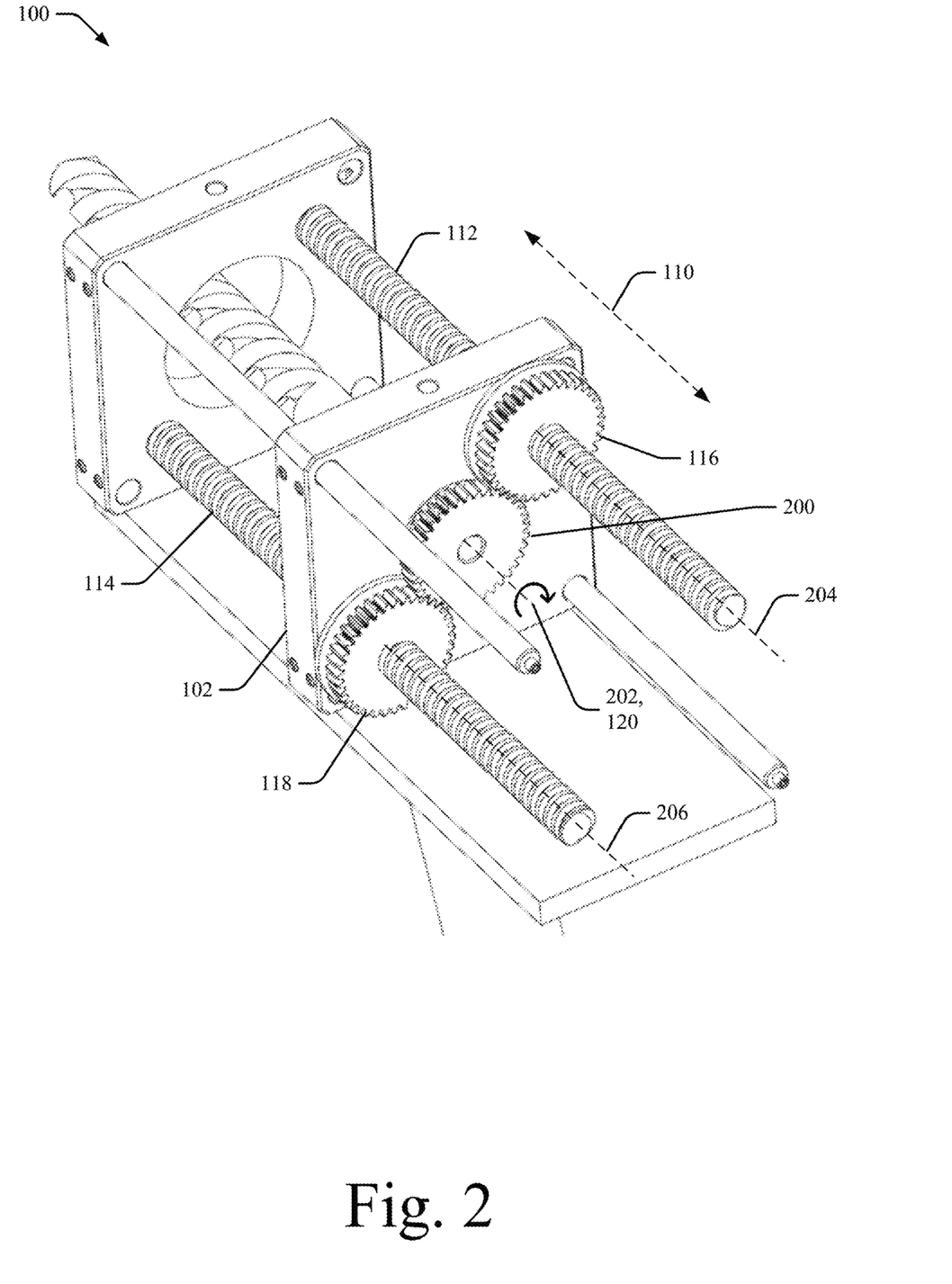
FIG. 2 illustrates a portion of the example linear differential apparatus of FIG. 1.

FIG. 2 is an illustration of a portion of the linear differential apparatus of FIG. 1. A portion of the slide portion 102 has been removed to more clearly illustrate the right-hand gear 116, left-hand gear 118, and driven gear 200 of the example apparatus 100. As illustrated, right-hand gear 116 meshes with driven gear 200, which in turn, meshes with left-hand gear 118. Driven gear 200 is connected to the end effector 104 (not shown in FIG. 2), such that, when driven gear 200 is rotated, the end effector 104 also rotates. The driven gear axis 202 coincides with the rotation axis 120 when the driven gear 200 is installed.

Also illustrated are the right-hand threaded rod axis 204 and the left-hand threaded rod axis 206. The right-hand threaded rod axis 204 coincides with the right-hand gear axis and left-hand threaded rod axis 206 coincides with the left-hand gear axis.

Although translation axis 110 is shown in a different location than in FIG. 1, it should be known to one of ordinary skill that a translation axis is merely a direction in three-dimensional space. The rotation axes, however, have a direction and location relative to their respective parts. For example, the rotation axis 120 is parallel to the right-hand threaded rod axis 204 but at a different location in the apparatus 100.

Translation

Figure 3:
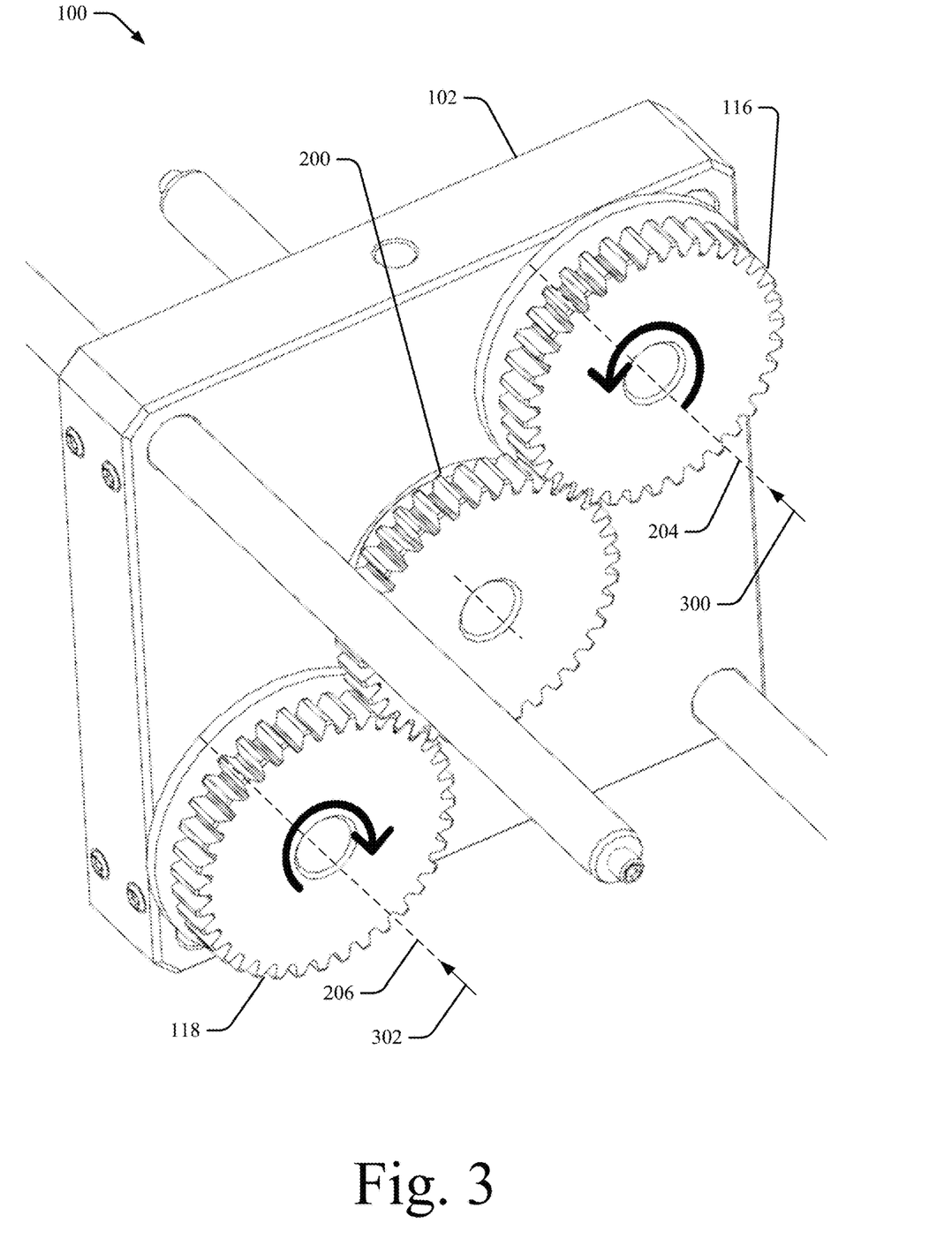
FIG. 3 illustrates an example translation operation of the example linear differential apparatus of FIG. 1.

FIG. 3 is an illustration of an example translation operation of the example linear differential apparatus 100. In order to cause pure translation of the end effector 104 along the translation axis 110 (e.g., with no rotation of end effector 104), the right-hand and left-hand threaded rods 112, 114 (not shown in FIG. 3) are rotated in different/opposite directions, at speeds, which combined with their respective thread pitches, cause the right-hand and left-hand gears (116, 118) to experience similar rotational moments. In the illustrated example, the right-hand threaded rod 112 is rotated counter-clockwise and left-hand threaded rod 114 is rotated clockwise. When rotated, the right-hand and left-hand threaded rods 112, 114 apply rotation moments to their respective gears. In the illustrated example, the right-hand threaded rod 112 applies a counterclockwise moment to the right-hand gear 116 and the left-hand threaded rod 114 applies a clockwise moment to the left-hand gear 118. Because the right-hand and left-hand gears 116, 118 are attempting to turn in opposite directions, they both stall on the driven gear 200. In other words, because the driven gear 200 is meshed between the right-hand and left-hand gears 116, 118, none of the gears can rotate in this scenario. Since the right-hand and left-hand gears 116, 118 cannot rotate, the right-hand and left-hand threaded rods 112, 114 are forced to thread though the right-hand and left-hand gears 116, 118. This causes a right-hand force 300 on the slide portion 102 near the right-hand threaded rod axis 204 and a similar left-hand force 302 on the slide portion 102 near the left-hand threaded rod axis 206. Because the right-hand and left-hand forces 300, 302 are in the same direction and have similar magnitudes, the right-hand and left-hand forces 300, 302 cause the slide portion 102, including the end effector 104, to translate along the translation axis 110. If the directions of the rotations of the right-hand and left-hand threaded rods 112, 114 are reversed, the end effector 104 will translate along the translation axis 110 in the opposite direction.

Rotation

Figure 4:
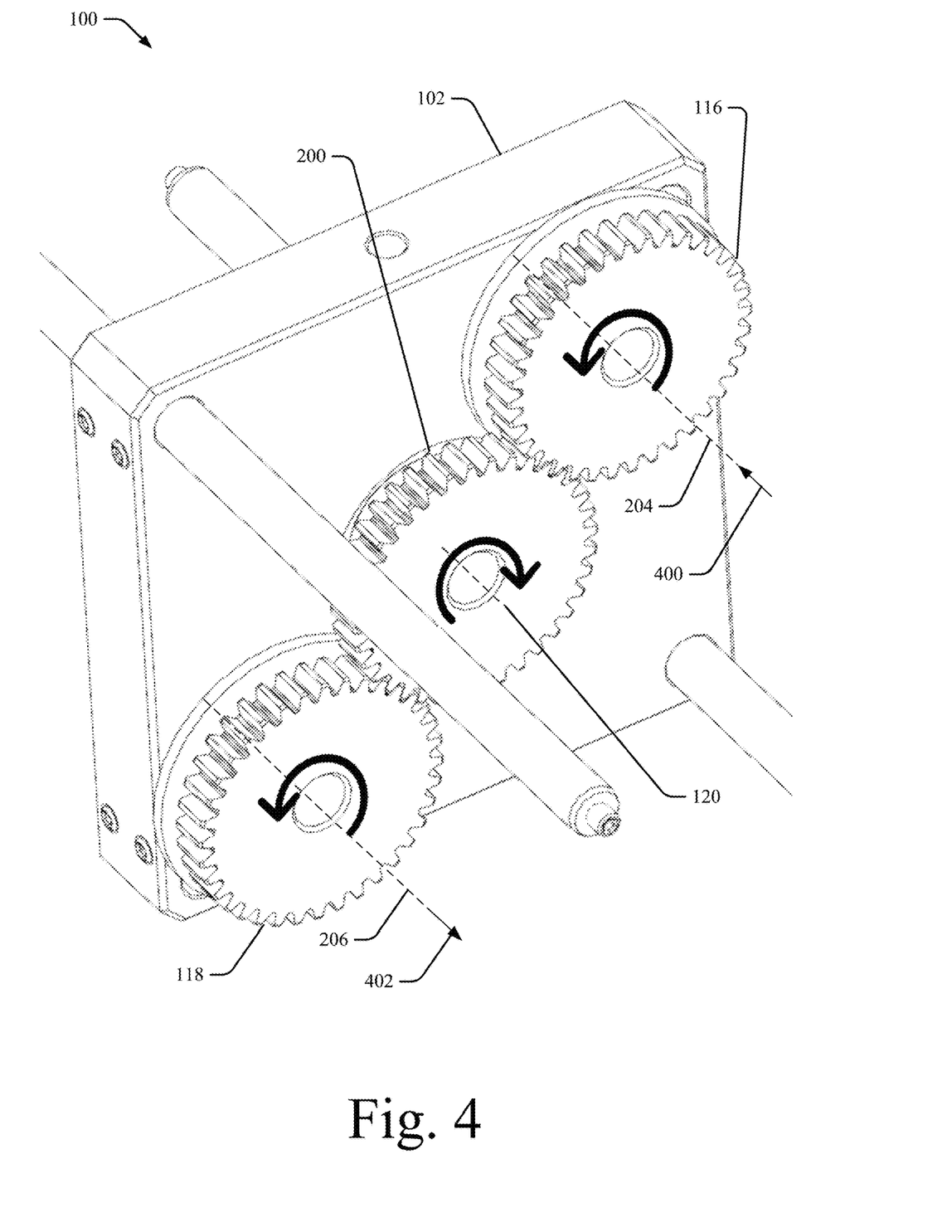
FIG. 4 illustrates an example rotation operation of the example linear differential apparatus of FIG. 1.

FIG. 4 is an illustration of an example rotation operation of the example linear differential apparatus 100. In order to cause rotation of the end effector 104 around the rotation axis 120 (e.g., with no translation of end effector 104), the right-hand and left-hand threaded rods 112, 114 (not shown) are rotated in a same direction at speeds, which combined with their respective thread pitches, cause the right-hand and left-hand gears (116, 118) to rotate as similar speeds. In the illustrated example, the right-hand and left-hand threaded rods 112, 114 are both rotated counter-clockwise. When so rotated, the right-hand and left-hand threaded rods 112, 114 apply rotational force through the right-hand and left-hand gears 116, 118, respectively (e.g., try to thread through the right-hand and left-hand gears 116, 118). However, because the threads are reversed between the right-hand and left-hand threaded rods 112, 114, the right-hand and left-hand threaded rods 112, 114 apply similar forces on the slide portion 102 in their respective locations but in opposite directions. For example, the right-hand threaded rod 112 causes the right-hand gear 116 to apply a right-hand force 400 near the right-hand threaded rod axis 204 and the left-hand threaded rod 114 causes the left-hand gear 118 to apply a left-hand force 402 near the left-hand threaded rod axis 206. Because the slide portion 102 is guided by slide alignment portion 108 and because right-hand and left-hand forces 400, 402 have similar magnitudes, the right-hand and left-hand forces 400, 402 cause the slide portion 102 to bind with slide alignment portion 108. In other words, the slide portion 102 is unable to translate along the translation axis 110 in this scenario. When the slide portion 102 is bound with the slide alignment portion 108, the right-hand and left-hand threaded rods 112, 114 cannot thread through their respective gears, which forces the respective gears to rotate. Since the right-hand and left-hand gears 116, 118 are spinning in a same direction (e.g., counterclockwise), the driven gear 200, and, thus, the end effector 104 rotates in the opposite direction (e.g., clockwise). If the directions of the rotations of the right-hand and left-hand threaded rods 112, 114 are reversed, the end effector 104 will rotate around the rotation axis 120 in the opposite direction (counterclockwise).

Translation and Rotation

Figure 5:
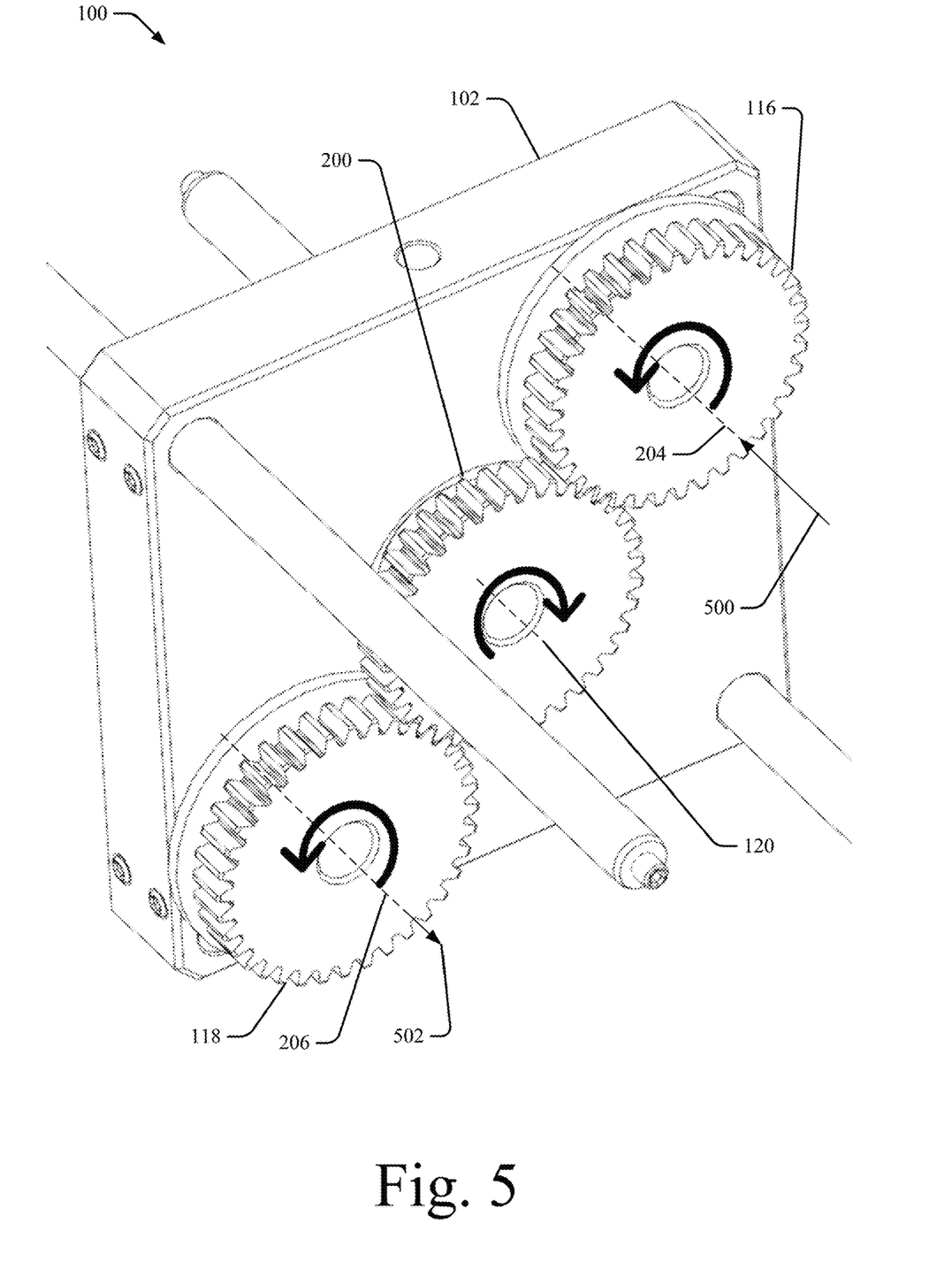
FIG. 5 illustrates an example translation and rotation operation of the example linear differential apparatus of FIG. 1.

FIG. 5 is an illustration of an example translation and rotation operation of the example linear differential apparatus of FIG. 1. In general, translation and rotation is achieved through a combination of the scenarios of FIGS. 3 and 4. In order to cause a rotation of the end effector 104 around the rotation axis 120 and a translation of the end effector 104 along the translation axis 110, the right-hand and left-hand threaded rods 112, 114 (not shown) are rotated in a same or different directions, at speeds, which when combined with their respective thread pitches, cause the right-handed and left-handed gears (116, 118) to rotate at different speeds. In the illustrated example, right-hand and left-hand threaded rods 112, 114 are rotated counter-clockwise with the right-hand threaded rod 112 rotating faster. When so rotated, the right-hand and left-hand threaded rods 112, 114 apply rotational force through the right-hand and left-hand gears 116, 118, respectively (e.g., try to thread through the right-hand and left-hand gears 116, 118). However, similarly to the scenario of FIG. 4, the right-hand and left-hand threaded rods 112, 114 apply forces on the slide portion 102 in their respective locations but in opposite directions (e.g., right-hand force 500 and left-hand force 502). Again, the right-hand and left-hand threaded rods 112, 114 are rotating at speeds, that, when combined with their respective thread pitches, cause the right and left-hand gears (116, 118) to rotate at different speeds. This causes the resultant forces on the slide portion 102 have different magnitudes (e.g., right-hand force 500 is stronger than left-hand force 502). The different magnitudes cause a partial binding which still forces the driven gear 200, and thus, the end effector 104 to rotate while still allowing the larger magnitude force to cause the slide portion 102, and thus, the end effector 104 to translate. In the illustrated example, because right-hand force 500 has a greater magnitude than left-hand force 502, the slide portion 102, and, thus, the end effector 104, would translate into the page.

In a translation and rotation scenario, there are four possible combinations of movement: translate in a positive direction and rotate in the clockwise direction, translate in the positive direction and rotate in the counter-clockwise direction, translate in the negative direction and rotate in the clockwise direction, and translate in the negative direction and rotate in the counter-clockwise direction. Changing whether the right-hand threaded rod 112 or the left-hand threaded rod 114 is rotating faster than the other or changing whether the right-hand and left-hand threaded rods 112, 114 are rotating in a same or different direction causes changes in the resulting movement.

By changing rotation speeds/direction and threads of the right-hand and left-hand threaded rods 112, 114, the apparatus 100 may be configured for a variety of applications. As discussed above, changing threads of the right-hand and left-hand threaded rods (and corresponding threads of the right-hand and left-hand gears 116, 118) may change the apparatus 100 from being rotation dominant to translation dominant or visa-versa.

Another Linear Differential Apparatus

FIG. 6 illustrates another example apparatus 600 of a linear differential. Although configured differently than the apparatus 100, the operation of the apparatus 600 is similar, and similar parts are numbered similarly. For the sake of brevity, parts will only be identified and any differences between the apparatus 600 and the apparatus 100 will be described. The apparatus 600 contains the slide portion 102 and the end effector 104 (not shown but disposed on the opposite side of the slide portion 102 relative to the driven gear 200). In the illustrated embodiment, the slide portion 102 is a single plate as opposed to the double plate of the apparatus 100. The apparatus 600 also contains the slide alignment portion 108 configured as two linear rails mounted to a base plate. The base plate The slide portion 102 slides along the slide alignment portion 108 via pillow blocks, linear bearings connected to the slide portion 102, or other suitable mechanism. Disposed through the slide portion 102 are the right-hand and left-hand threaded rods 112, 114. Threaded onto the right-hand threaded rod 112 is the right-hand gear 116 and threaded onto the left-hand threaded rod is the left-hand gear 118.

In the illustrated embodiment, the right-hand and left-hand gears are two-piece assemblies with gears containing thru holes and threaded nuts attached thereto. Furthermore, because the slide portion 102 in the apparatus 600 is not a two-piece structure sandwiching the gears, as in the apparatus 100, the right-hand and left-hand gears 116, 118 (as well as the driven gear 200) are attached to their respective bearings.

The driven gear 200 is meshed between the right-hand gear 116 and the left-hand gear 118. In order to rotate the right-hand and left-hand threaded rods 112, 114, the right-hand drive portion 122 is attached to the right-hand threaded rod 112 and the left-hand drive portion 124 is attached to the left-hand threaded rod 114. The apparatus 600 also contains a threaded rod alignment portion 126 configured to align the right-hand and left-hand threaded rods 112, 114.

Based on the above, it should be readily apparent that the linear differential described herein accomplishes a parallel translation and rotation motion platform without complicated linkages and using standard/off the shelf parts.

Method

Figure 7:
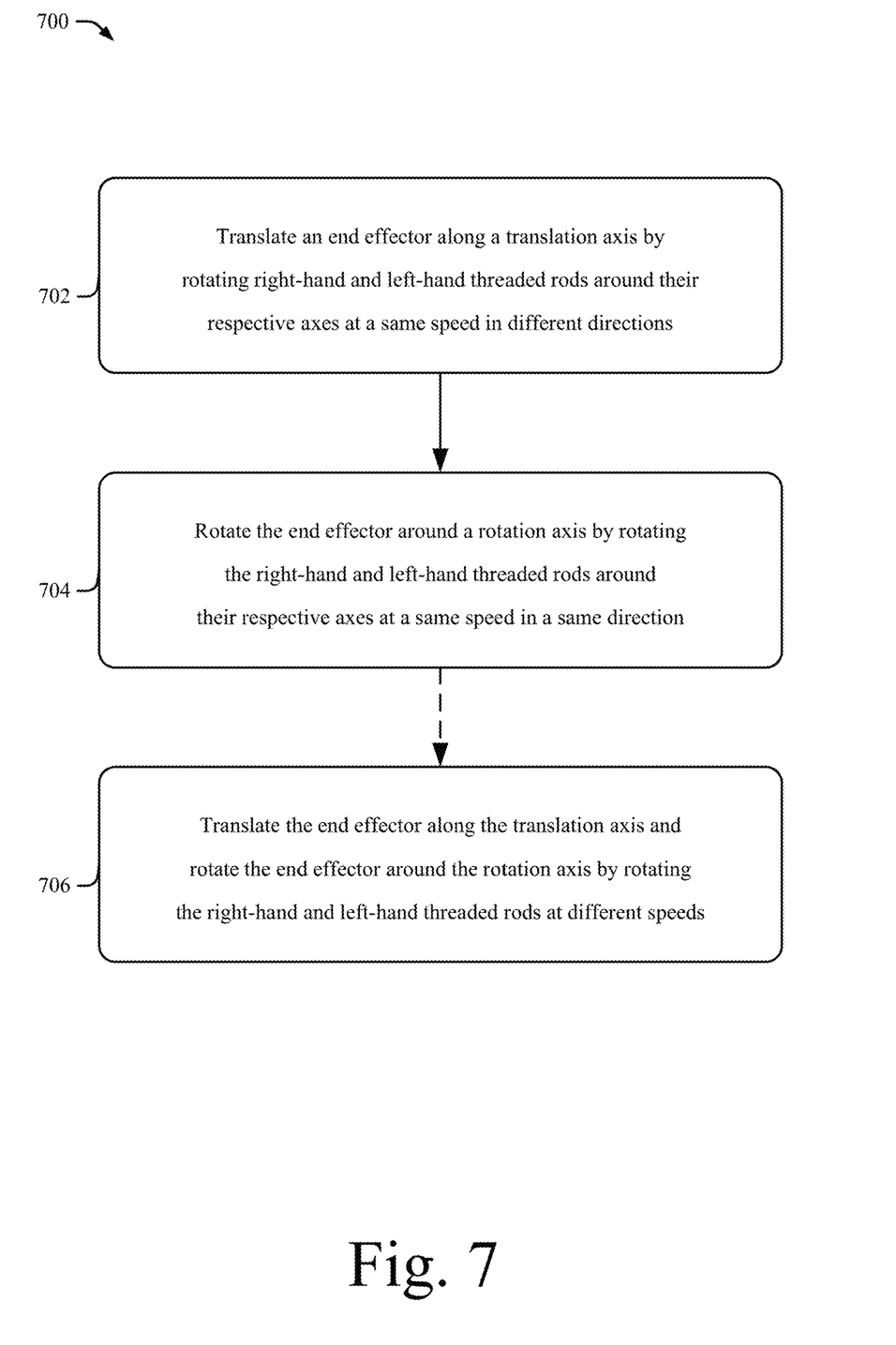
FIG. 7 illustrates a method of operating a linear differential.

FIG. 7 illustrates an example method 700 of operating a linear differential. Components described in regard to FIGS. 1-6 with like names should be considered to be examples of the components performing the method 700 below.

At 702, an end effector is translated along a translation axis by rotating right-hand and left-hand threaded rods around their respective axes at speeds that cause right-hand and left-hand gears that are mated to the right-hand and left-hand threaded rods, respectively, to rotate at a same speed in different directions. The right-hand and left-hand threaded rods are disposed through a slide portion that is attached to the end effector and disposed parallel to the translation axis. The right-hand and left-hand gears are connected via a driven gear meshed therebetween and rotatably affixed to the slide portion such that the right-hand and left-hand gears can rotate around their respective axes but not translate along the translation axis relative to the slide portion. As discussed above, because the driven gear does not allow the right-hand and left-hand gears to rotate in different directions, the right-hand and left-hand gears are threaded up or down the right-hand and left-hand threaded rods causing the translation of the end effector along the translation axis.

At 704, the end effector is rotated around a rotation axis by rotating the right-hand and left-hand threaded rods around their respective axes at speeds that cause the right-hand and left-hand gears to rotate at a same speed in a same direction. As discussed above, because the rotations cause the slide portion to bind, the right-hand and left-hand gears are not able to thread up or down the right-hand and left-hand threaded rods, and thus, the driven gear is forced to rotate. Because the driven gear is affixed to the end effector and has a same rotation axis, the rotation of the driven gear causes the rotation of the end effector around the rotation axis.

Optionally, at 706, the end effector is translated along the translation axis and rotated around the rotation axis by rotating the right-hand and left-hand threaded rods at speeds that cause the right-hand and left-hand gears to rotate at different speeds.

EXAMPLES

Example 1: A linear differential apparatus configured to provide rotation and translation to an end effector, the linear differential apparatus comprising: a slide portion configured to provide the translation to the end effector along a translation axis; a right-hand threaded rod disposed through the slide portion and parallel to the translation axis; a left-hand threaded rod disposed through the slide portion and parallel to the right-hand threaded rod; a right-hand gear comprising internal right-hand threads that are mated to the right-hand threaded rod, the right-hand gear rotatably affixed to the slide portion such that the right-hand gear can rotate around a right-hand gear axis but not translate along the translation axis relative to the slide portion; a left-hand gear comprising internal left-hand threads that are mated to the left-hand threaded rod, the left-hand gear rotatably affixed to the slide portion such that the left-hand gear can rotate around a left-hand gear axis but not translate along the translation axis relative to the slide portion; a driven gear connected to the end effector and configured to provide the rotation to the end effector, the driven gear: meshed between the right-hand gear and the left-hand gear; and rotatably affixed to the slide portion such that the driven gear can rotate around a rotation axis but not translate along the translation axis relative to the slide portion; a right-hand drive portion affixed to the right-hand threaded rod and configured to rotate the right-hand threaded rod around a right-hand threaded rod axis; and a left-hand drive portion affixed to the left-hand threaded rod and configured to rotate the left-hand threaded rod around a left-hand threaded rod axis.

Example 2: The linear differential apparatus of example 1, further comprising a threaded rod alignment portion that locates the right-hand threaded rod and the left-hand threaded rod.

Example 3: The linear differential apparatus of example 2, further comprising a slide alignment portion configured to allow the slide portion to translate along the translation axis but restrict movement in one or more other degrees of freedom.

Example 4: The linear differential apparatus of example 3, wherein: the slide portion comprises one or more flat sliding surfaces; and the slide alignment portion comprises another flat sliding surface that engages the flat sliding surfaces of the slide portion.

Example 5: The linear differential apparatus of example 3, wherein the slide alignment portion comprises one or more rails or channels.

Example 6: The linear differential apparatus of example 5, further comprising one or more linear bearings affixed to the slide portion for engagement with the rails or channels.

Example 7: The linear differential apparatus of example 3, wherein the slide alignment portion is attached to the threaded rod alignment portion.

Example 8: The linear differential apparatus of example 1, wherein the slide portion comprises a first slide portion and a second slide portion, the first and second slide portions surrounding the right-hand gear, the left-hand gear, and the driven gear.

Example 9: The linear differential apparatus of example 8, wherein the first and second slide portions comprise parallel plates.

Example 10: The linear differential apparatus of example 1, wherein the slide portion comprises a bearing portion that allows the right-hand and left-hand threaded rods to rotate relative to the slide portion and that allows the slide portion to translate along the translation axis relative to the right-hand and left-hand threaded rods.

Example 11: The linear differential apparatus of example 1, wherein the end effector comprises a collet, collar, or chuck.

Example 12: The linear differential apparatus of example 1, wherein the right-hand drive portion and the left-hand drive portion comprise electric motors.

Example 13: The linear differential apparatus of example 1, wherein the end effector purely translates along the translation axis responsive to the right-hand threaded rod and the left-hand threaded rod being rotated at respective speeds that cause the right-hand gear and the left-hand gear to rotate at a same speed and in different directions.

Example 14: The linear differential apparatus of example 1, wherein the end effector purely rotates around the rotation axis responsive to the right-hand threaded rod and the left-hand threaded rod being rotated at respective speeds that cause the right-hand gear and the left-hand gear to rotate at a same speed and in a same direction.

Example 15: The linear differential apparatus of example 1, wherein the end effector translates along the translation axis and rotates around the rotation axis responsive to the right-hand threaded rod and the left-hand threaded rod being rotated respective speeds that cause the right-hand gear and the left-hand gear to rotate at different speeds.

Example 16: A method of operating a linear differential apparatus, the method comprising: translating an end effector along a translation axis by: rotating a right-hand threaded rod around a right-hand threaded rod axis, the right-hand threaded rod: disposed through a slide portion that is attached to the end effector; disposed parallel to the translation axis; and mated to internal right-hand threads of a right-hand gear, the right-hand gear rotatably affixed to the slide portion such that the right-hand gear can rotate around a right-hand gear axis but not translate along the translation axis relative to the slide portion; and rotating a left-hand threaded rod around a left-hand threaded rod axis in a different direction than the right-hand threaded rod and at a speed that causes a left-hand gear that is mated thereto to rotate at a same speed as the right-hand gear, the left-hand threaded rod: disposed through the slide portion; disposed parallel to the right-hand threaded rod; and mated to internal left-hand threads of the left-hand gear, the left-hand gear rotatably affixed to the slide portion such that the left-hand gear can rotate on a left-hand gear axis but not translate along the translation axis relative to the slide portion; and rotating the end effector around a rotation axis by: rotating a driven gear that is fixed to the end effector, the driven gear meshed between the right-hand gear and the left-hand gear and rotatably affixed to the slide portion such that the driven gear can rotate around the rotation axis but not translate along the translation axis relative to the slide portion, the rotating the driven gear performed by: rotating the right-hand threaded rod around the right-hand threaded rod axis; and rotating the left-hand threaded rod around the left-hand threaded rod axis in a same direction and as the right-hand threaded rod and at the speed that causes the left-hand gear to rotate at the same speed as the right-hand gear.

Example 17: The method of example 16, wherein the end effector translates along the translation axis via one or more linear rails or guides that are mated with the slide portion.

Example 18: The method of example 16, wherein the end effector comprises a collet, collar, or chuck for accepting a drill bit.

Example 19: The method of claim 16, further comprising translating the end effector along the translation axis concurrently with rotating the end effector around the rotation axis by: rotating the right-hand threaded rod around the right-hand threaded rod axis; and rotating the left-hand threaded rod around the left-hand threaded rod axis at a different speed that causes the left-hand gear to rotate at a different speed than the right-hand gear.

Example 20: The method of claim 16, further comprising: monitoring loads of respective motors that cause the rotations of the right-hand threaded rod and the left-hand threaded rod; and determining at least one of an end effector torque or an end effector force based on the loads.

CONCLUSION

Although a linear differential apparatus and portions thereof have been described in language specific to features and/or methods, it is to be understood that the subject of the appended claims is not necessarily limited to the specific features or methods described. Rather, the specific features and methods are disclosed as example implementations of a linear differential apparatus.

What is claimed is:
1. A linear differential apparatus, comprising:
   a slide portion that provides translation to an end effector along a translation axis;
   a right-hand threaded rod disposed through the slide portion and parallel to the translation axis;
   a left-hand threaded rod disposed through the slide portion and parallel to the right-hand threaded rod;
   a right-hand gear comprising internal right-hand threads that are mated to the right-hand threaded rod, the right-hand gear rotatably affixed to the slide portion such that the right-hand gear can rotate around a right-hand gear axis and not translate along the translation axis relative to the slide portion;
   a left-hand gear comprising internal left-hand threads that are mated to the left-hand threaded rod, the left-hand gear rotatably affixed to the slide portion such that the left-hand gear can rotate around a left-hand gear axis and not translate along the translation axis relative to the slide portion;
   a driven gear connected to the end effector that provides rotation to the end effector, the driven gear:
      meshed between the right-hand gear and the left-hand gear; and rotatably affixed to the slide portion such that the driven gear can rotate around a rotation axis and not translate along the translation axis relative to the slide portion;

a right-hand drive portion affixed to the right-hand threaded rod that rotates the right-hand threaded rod around a right-hand threaded rod axis; and a left-hand drive portion affixed to the left-hand threaded rod that rotates the left-hand threaded rod around a left-hand threaded rod axis.

2. The linear differential apparatus of claim 1, further comprising a threaded rod alignment portion that locates the right-hand threaded rod and the left-hand threaded rod.

3. The linear differential apparatus of claim 2, further comprising a slide alignment portion that allows the slide portion to translate along the translation axis and restrict movement in one or more other degrees of freedom.

4. The linear differential apparatus of claim 3, wherein:
the slide portion comprises one or more sliding surfaces; and
the slide alignment portion comprises another sliding surface that engages the one or more sliding surfaces of the slide portion.

5. The linear differential apparatus of claim 3, wherein the slide alignment portion comprises one or more rails or channels.

6. The linear differential apparatus of claim 5, further comprising one or more linear bearings affixed to the slide portion for engagement with the one or more rails or channels.

7. The linear differential apparatus of claim 3, wherein the slide alignment portion is attached to the threaded rod alignment portion.

8. The linear differential apparatus of claim 1, wherein the slide portion comprises a first slide portion and a second slide portion, the first slide portion and the second slide portion surrounding the right-hand gear, the left-hand gear, and the driven gear.

9. The linear differential apparatus of claim 8, wherein the first slide portion and the second slide portion comprise parallel plates.

10. The linear differential apparatus of claim 1, wherein the slide portion comprises a bearing portion that allows the right-hand threaded rod and the left-hand threaded rod to rotate relative to the slide portion and that allows the slide portion to translate along the translation axis relative to the right-hand threaded rod and the left-hand threaded rod.

11. The linear differential apparatus of claim 1, wherein the end effector comprises a collet, collar, or chuck.

12. The linear differential apparatus of claim 1, wherein the right-hand drive portion and the left-hand drive portion comprise electric motors.

13. The linear differential apparatus of claim 1, wherein the end effector purely translates along the translation axis responsive to the right-hand threaded rod and the left-hand threaded rod being rotated at respective speeds that cause the right-hand gear and the left-hand gear to rotate at a same speed and in different directions.

14. The linear differential apparatus of claim 1, wherein the end effector purely rotates around the rotation axis responsive to the right-hand threaded rod and the left-hand threaded rod being rotated at respective speeds that cause the right-hand gear and the left-hand gear to rotate at a same speed and in a same direction.

15. The linear differential apparatus of claim 1, wherein the end effector translates along the translation axis and rotates around the rotation axis responsive to the right-hand threaded rod and the left-hand threaded rod being rotated respective speeds that cause the right-hand gear and the left-hand gear to rotate at different speeds.

16. A method of operating a linear differential apparatus, the method comprising:
translating an end effector along a translation axis by:
rotating a right-hand threaded rod around a right-hand threaded rod axis, the right-hand threaded rod:
disposed through a slide portion that is attached to the end effector;
disposed parallel to the translation axis; and
mated to internal right-hand threads of a right-hand gear, the right-hand gear rotatably affixed to the slide portion such that the right-hand gear can rotate around a right-hand gear axis and not translate along the translation axis relative to the slide portion; and
rotating a left-hand threaded rod around a left-hand threaded rod axis in a different direction than the right-hand threaded rod and at a speed that causes a left-hand gear that is mated thereto to rotate at a same speed as the right-hand gear, the left-hand threaded rod:
disposed through the slide portion;
disposed parallel to the right-hand threaded rod; and
mated to internal left-hand threads of the left-hand gear, the left-hand gear rotatably affixed to the slide portion such that the left-hand gear can rotate on a left-hand gear axis and not translate along the translation axis relative to the slide portion; and
rotating the end effector around a rotation axis by:
rotating a driven gear that is fixed to the end effector, the driven gear meshed between the right-hand gear and the left-hand gear and rotatably affixed to the slide portion such that the driven gear can rotate around the rotation axis and not translate along the translation axis relative to the slide portion, wherein rotating the driven gear comprises:
rotating the right-hand threaded rod around the right-hand threaded rod axis; and
rotating the left-hand threaded rod around the left-hand threaded rod axis in a same direction as the right-hand threaded rod and at the speed that causes the left-hand gear to rotate at the same speed as the right-hand gear.

17. The method of claim 16, wherein the end effector translates along the translation axis via one or more linear rails or guides that are mated with the slide portion.

18. The method of claim 16, wherein the end effector comprises a collet, collar, or chuck for accepting a drill bit.

19. The method of claim 16, further comprising translating the end effector along the translation axis concurrently with rotating the end effector around the rotation axis by:
rotating the right-hand threaded rod around the right-hand threaded rod axis; and
rotating the left-hand threaded rod around the left-hand threaded rod axis at a different speed that causes the left-hand gear to rotate at a different speed than the right-hand gear.

20. The method of claim 16, further comprising:
monitoring loads of respective motors that cause the rotating of the right-hand threaded rod and the left-hand threaded rod; and
determining at least one of an end effector torque or an end effector force based on the loads.

* * * * *